Figure 1:
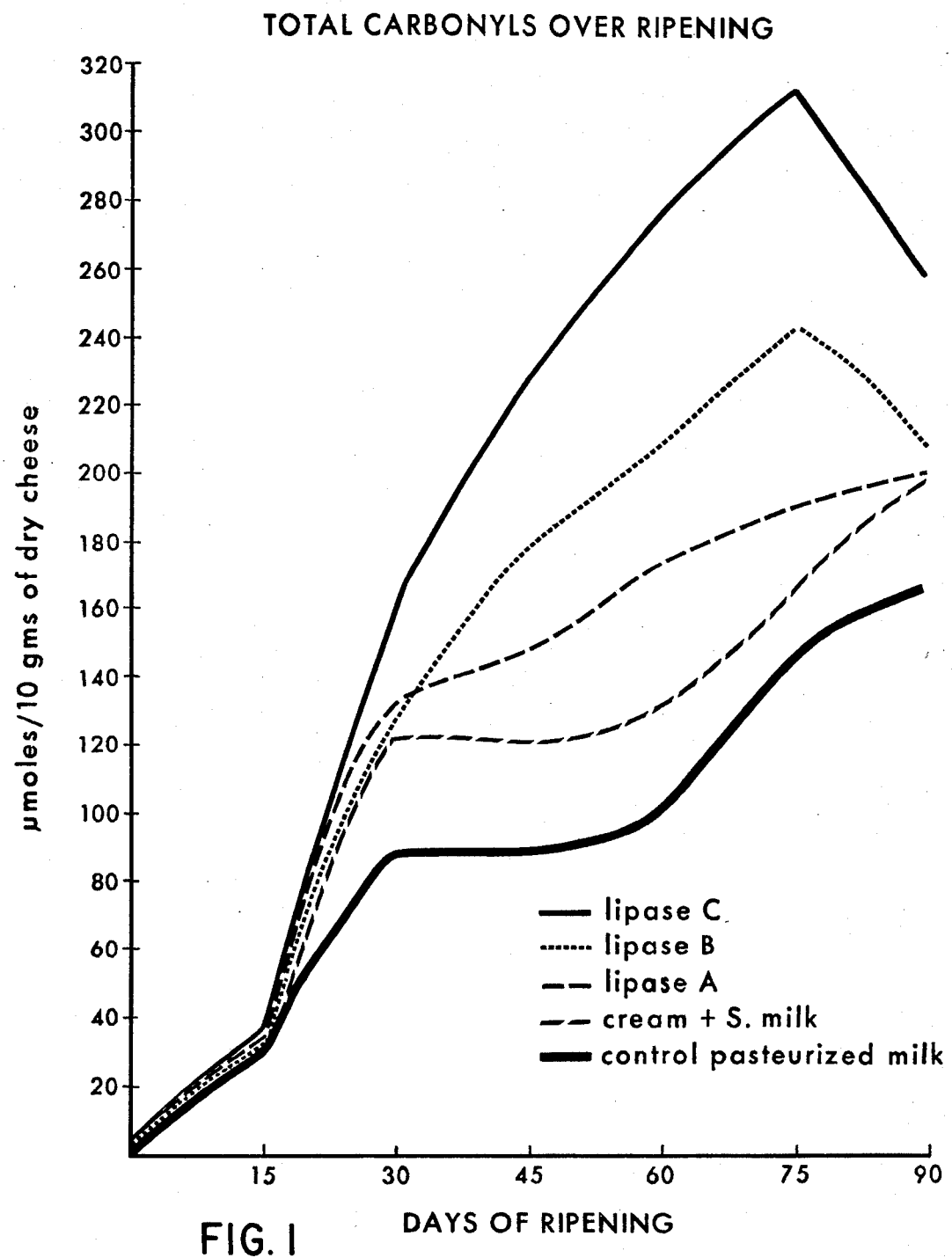

United States Patent [19]
Kosikowski et al.

[11] 3,973,042
[45] Aug. 3, 1976

[54] FLAVOR DEVELOPMENT BY MICROBIAL LIPASES IN PASTEURIZED MILK BLUE CHEESE

[75] Inventors: Frank V. Kosikowski; Ramesh C. Jolly, both of Ithaca, N.Y.

[73] Assignee: Cornell Research Foundation, Inc., Ithaca, N.Y.

[22] Filed: May 10, 1974

[21] Appl. No.: 468,863

[52] U.S. Cl. .............................. 426/35; 426/37; 426/61; 426/582
[51] Int. Cl.[2] ........................................ A23C 19/12
[58] Field of Search .................. 426/33, 34, 35, 36, 426/37, 38, 42, 56, 63, 188, 361, 61, 582

[56] References Cited
UNITED STATES PATENTS

| | | | |
|---|---|---|---|
| 2,531,329 | 11/1950 | Farnham | 426/63 X |
| 2,560,182 | 7/1951 | Nelson et al. | 426/35 |
| 3,295,991 | 1/1967 | Cort et al. | 426/38 X |
| 3,635,734 | 1/1972 | Williamson et al. | 426/37 |

*Primary Examiner*—Raymond N. Jones
*Assistant Examiner*—R. A. Yoncoskie
*Attorney, Agent, or Firm*—Lawrence E. Laubschel; Ralph R. Barnard; Theodore C. Wood

[57] ABSTRACT

A method for producing blue cheese from pasteurized or heat treated milk, characterized by the addition to the cheese curds from which the whey has been drained, of a mixture of lipase, a Penicillium mold spore species, and salt. The Penicillium species may include *Penicillium roqueforti* or *Penicillium glaucum*, and the lipase is preferably a microbial lipase formed from Aspergilli ssp., Penicillium ssp. or Rhizopus ssp., or suitable animal lipase sources. The resultant cheese product is imparted with the appropriate blue cheese flavor with required rancidity in a greatly shortened period of time (i.e., about 2 to 4 months).

7 Claims, 3 Drawing Figures

FIG. I

FLAVOR DEVELOPMENT BY MICROBIAL LIPASES IN PASTEURIZED MILK BLUE CHEESE

This invention relates to an improved method for obtaining blue cheese from pasteurized or heat-treated milk in a greatly shortened period of time, characterized by the introduction of food grade lipase into the cheese curds from which the whey has been drained.

In the known methods for obtaining blue cheese, the milk is either raw, heat treated or pasteurized, and may be homogenized in this state for later increases in the free fatty acid levels to produce more flavor. Normally the time required for the production of blue cheese ranges from four to seven months. In the prior art the inducement of optimum typical flavor in blue cheese over shorter periods has received considerable research attention. The most common practice is to separate raw milk or homogenize and decolorize the cream and recombine it with pasteurized skim milk. B-oxidation pathways of free fatty acids deacylation and decarboxylation to methyl ketones leading to typical flavor have been outlined by Gehrig and Knight (R. F. Gehrig and S. G. Knight. 1963. "Fatty acid oxidation by spores of P. Roqueforti." J. of Appl. Micro. 11: 166–170); Hammer and Bryant (B. W. Hammer and H. W. Bryant. 1937. "Flavor constituent of blue cheese." Iowa State College J. Sci. 11: 281); and Katz and Chaikoff (J. Katz and I. L. Chaikoff. 1955. "Synthesis via Kreb's cycle in the utilization of acetate by rat liver slices." Biochemica et Biophysica Acta 18: 87). The influence of heat on the inactivation of milk lipases has been reported by Gould and Trout (I. A. Gould and G. M. Trout. 1939. "Lipase action in mixture of raw and pasteurized homogenized milk." Quart. Bull. Mich. Agric. Exp. Sta. 22,101.); Harper and Gould (W. J. Harper and I. A. Gould. 1959. "Some factors affecting the heat inactivation of the milk lipase enzyme system." Int. Dairy Congress 1959; Vol. 1: 455); Nilson and Willart (R. Nilson and S. Willart. 1960. "The influence of homogenization on the fat splitting in milk." Rep. Milk & Dairy Research, Alnarp, Sweden 60.); Sjostrom (Sjostrom, G. 1959. "Lipase problems in milk and dairy products." Rep. Milk & Dairy Res. Alnarp, Sweden 58.); and Stadhouders and Mulder (J. Stadhouders and H. Mulder. 1959. "Surface organisms associated with fat hydrolysis in cheese." Neth. Milk Dairy J. 13, 291.). It is generally estimated that blue cheese from raw or pasteurized, homogenized milk requires approximately 4–7 months at 40°–50°F. to obtain peak flavor. Natural materials containing lipase have been added to raw, pasteurized, homogenized milk, but bitterness invariably accompanied the flavor development, Gould and Trout (previously cited); Lassen et al (P. B. Lassen, G. M. Trout, and I. A. Gould. 1941. "Rancidity studies on mixtures of raw and pasteurized homogenized milk." J. Dairy Science 24, 771); and Nilson and Willart (R. Nilson and S. W. Willart. 1961. "The heat inactivation of the fat splitting in milk." Rep. Milk & Dairy Research, Alnarp, Sweden 60.).

Possible sources of the lipases in blue cheese ripening are (1) the milk, (2) natural microflora of the milk and cheese, (3) *P. roqueforti, P. glaucum* and related species, and (4) other enzyme extracts from natural materials. The presence of two lipolytic enzyme systems in milk is indicated by Chandan and Shahni (R.C. Chandan and K. M. Shahni. 1963. "Purification and characterization of milk lipase." II "Characterization of the purified enzyme." J. Dairy Sci. 46: 503–509.). Strains of P. roqueforti also differ in their lipolytic activity as observed by Proks et al (J. Proks, J. Dolezalek and Z. Peck. 1959. "A study on the coaction of the genus Torulopsis on the formation of methyl ketones in the cheese of the roquefort type." XV Intern. Dairy Congress 2(3) 729–735). Lawrence and Hawke (R. C. Lawrence and J. C. Hawke. 1966. "The incorporation of [1 -$^{14}$C] acetate into the methyl ketones in steam distillates of bovine milk fat." Biochem. J. 98: 25.) demonstrated two lipolytic enzyme systems in P. roqueforti. Various attempts have been made to accelerate lipolysis in blue cheese. Pancreatin, mulberry juice lipase, chicken stomach lipase, erepsin, steapsin, etc. have been tried.

Blue cheese from pasteurized milk to which low molecular weight fatty acids were added lacked complete flavor. The use of Candida lipolytica has been investigated by many workers as shown by the Nelson et al U.S. Pat. No. 2,560,182 and Wilcox et al (Wilcox, J. C., W. O. Nelson and W. A. Wood. 1955. "The selective release of volatile acids from butterfat by microbial lipases." J. Dairy Sci. 38: 755). The amount of preparations were not identical and judgment was based on volatile free fatty acids and flavor score in the above cases. The addition of pancreatic lipase to direct acidified milk gave a simulated blue cheese with typical flavor in 6 months, Shehata (A. E. Shehata. 1966. "Direct acidification of milk for blue cheesemaking." Ph.D. thesis, University of Wisconsin). However, information is lacking on the type of carbonyl compounds produced by various lipases and their significance to typical flavor.

Accordingly, a primary object of the present invention is to produce from pasteurized or heat-treated milk in a shorter period of time than normal a high quality blue cheese product, characterized in that there is introduced into the cheese curds a mixture of food grade lipase (microbial or animal), *Penicillium roqueforti* or *Penicillium glaucum* or related Penicillium ssp. mold spores, and salt. In one embodiment, the resultant loose curd product is molded to a desired form, needled for spore growth, incubated for about 30 days at 10°–20°C., and ripened for about 1 to 3 months. In a second embodiment, the loose curd product is merely incubated for about 5 to 30 days, whereupon the resultant loose curd product has utility as a flavoring ingredient for other products or which may be formed into a processed cheese type product. In the preferred embodiment, the lipase is a food grade microbial lipase obtained from an Aspergillus ssp. source (including *Aspergillus niger* and *Aspergillus oryzae*), although other species such as Penicillium ssp. and Rhizopus ssp. may be used.

A further object of the invention is to provide an enzyme and salt mixture for use in the production of blue cheese from milk, which mixture comprises food grade lipase powder (microbial or animal lipase) and sodium chloride. This mixture is adapted for use with a blue cheese-making process to produce a high quality cheese product in a greatly reduced period of time.

Another object of the invention is to provide an enzyme, salt and spore mixture for use in the production of blue cheese from milk, including food grade microbial lipase powder, blue cheese mold spores of either *Penicillium roqueforti, Penicillium glaucum* or related Penicillium ssp., and sodium chloride.

The present invention affords many advantages in the blue cheese-making art. First, since the invention utilizes pasteurized or heat-treated milk, the necessity of homogenization or cream separation is eliminated. Since the lipase is added to the curds rather than to the milk, there is an appreciable saving in the amount of lipase required to produce maximum typical flavors. The cheese whey has no rancidity, and there is an appreciable reduction in the amount of time required to produce the cheese product (i.e., a reduction to about 3 to 4 months, as distinguished from the 4 to 7 months overall period generally required).

Figure 2:
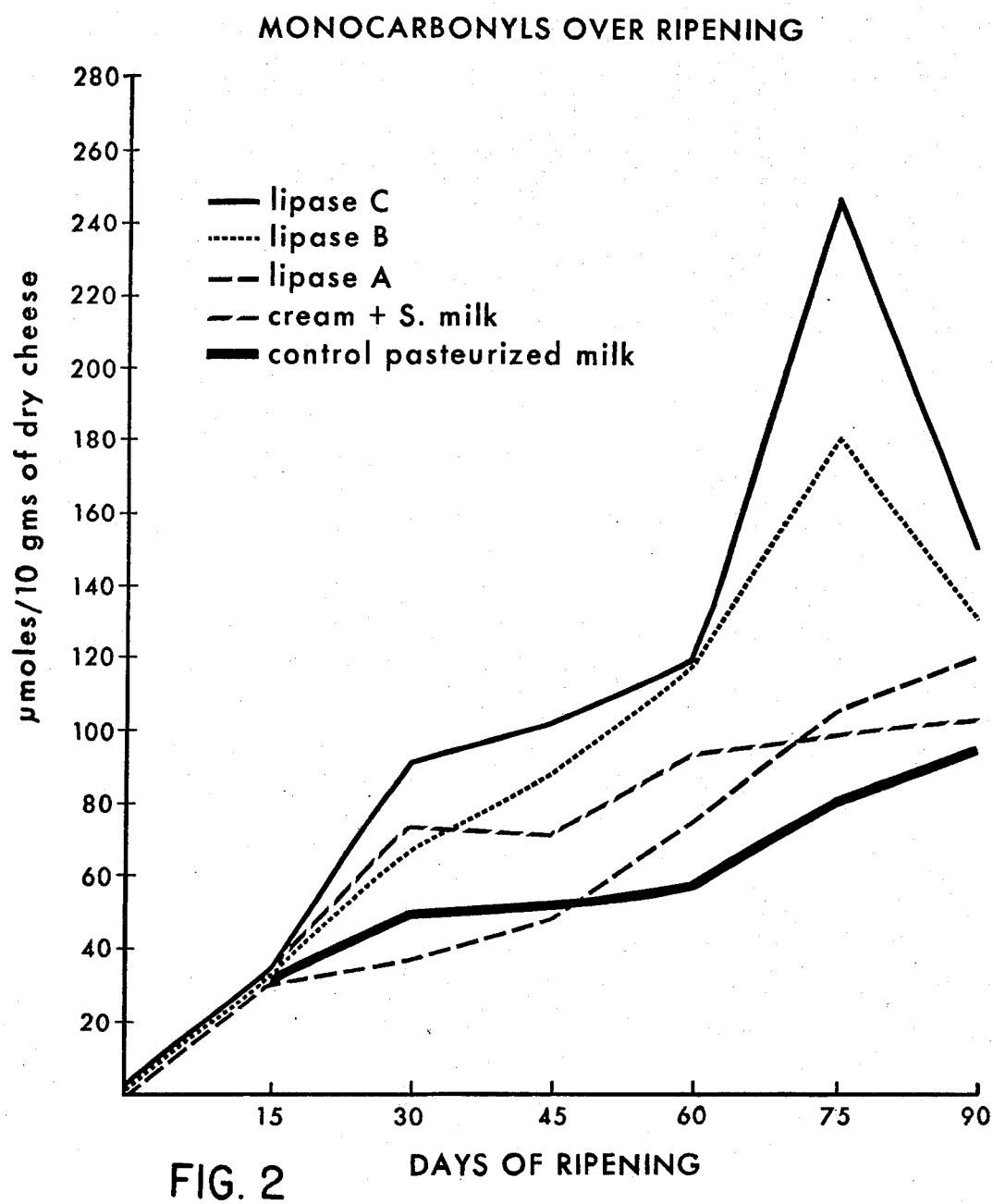
Figure 3:
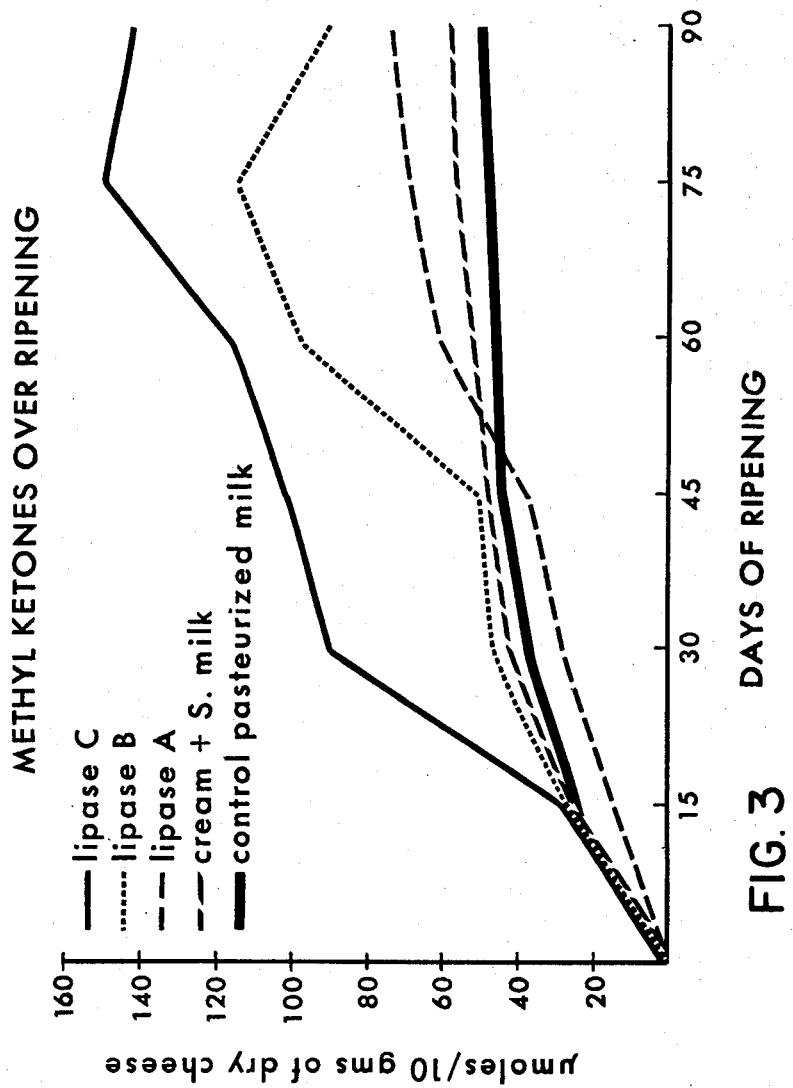

Other objects and advantages of the invention will become apparent from a study of the following specification when viewed in the light of the accompanying drawing, in which:

FIGS. 1–3 illustrate test results of the total carbonyls monocarbonyls and methyl ketones, respectively, during ripening of cheese samples produced by a test study.

A laboratory study was conducted to introduce into the curd various microbial and animal lipases together with salt and P. roqueforti spores and to observe the speed and quality of typical flavor development in pasteurized, homongenized milk cheese and the rate and type of methyl ketones produced. The following lipases were utilized:

| Test Designation | Source |
|---|---|
| Lipase A | Animal lipase (Lipase L of Dairyland Food Laboratories, Waukeshaw, Wisconsin) |
| Lipase B | Animal lipase (Lipase KI of Dairyland Food Laboratories) |
| Lipase C | Microbial lipase (Lipase 3500, Wallerstein Company, Morton Grove, Illinois) |

Equivalent microbial lipases that have been tested are lipase 4000, Wallerstein Company, Morton Grove, Illinois, and lipase 250, Miles Laboratories, Chicago, Illinois. Spores of P. roqueforti were obtained from the Midwest Blue Mold Company, Stillwater, Minnesota.

Blue cheese was prepared from 500 kg lots of (a) raw whole milk, (b) pasteurized skim milk plus homogenized raw cream, and (c) pasteurized whole milk as outlined by Kosikowski (Cheese and Fermented Milk Foods, Frank Kosikowski, Edward Brothers, Inc., Ann Arbor, Michigan, 1970). Commercial lipase preparations were introduced into the curd with salt and P. roqueforti spores at 0.5 to 1.5 gms per 7 kg curds. The curds were subsequently made into blue cheese. Plug samples from two wheels of each of the several lots prepared were analyzed in triplicate.

The moisture and fat content was 45 and 27.5 percent, respectively, for the control cheese at the end of 90 days.

In various samples of cheese made from control pasteurized milk, homogenized raw cream and pasteurized skim milk, and lipase A, lipase B, and lipase C, respectively, the nitrogen increased from 0.31 to 0.91 percent. The value for free volatile fatty acids increased from 8.99 to 26.20 and the pH of cheese increased from 5.0 to 6.4 from 0 to end of 90 days respectively. Highest pH increase was noticed at 45th day of ripening for lipase C, 60th day for lipase B and pasteurized milk blue cheese control and 90th day for lipase A and pasteurized skim milk and raw homogenized cream blue cheese control.

Blue cheese from raw whole milk developed unclean flavor and was excluded from further analysis. All blue cheese showed normal body and texture characteristics and uniform mild growth.

TABLE NO. 1

Soluble Nitrogen, Free Volatile Fatty Acids and Ph of Blue Cheese at 90th day of ripening

| Cheese Sample | Soluble Nitrogen Percent | Free Volatile Fatty Acids(1) | pH |
|---|---|---|---|
| Control - Past. milk 0 days | .31 | 8.99 | 5.0 |
| Control-Past. milk | .72 | 12.27 | 6.1 |
| Cream & Skim Milk Control | .65 | 12.32 | 5.5 |
| Lipase A | .86 | 13.49 | 6.4 |
| Lipase B | .80 | 13.94 | 5.9 |
| Lipase C | .91 | 26.20 | 5.4 |

(1)Ml N/10 NaOH/10 g. sample

TOTAL CARBONYLS AND MONOCARBONYLS

The total carbonyls (Table 2, FIG. 1) increased with time to maximums at 40°F for lipase B and lipase C and for blue cheese made from pasteurized milk, pasteurized skim milk and raw homogenized cream and lipase A after 90 days. The total monocarbonyls (FIG. 2) and total methyl ketones followed a similar pattern (FIG. 3, Table 2). Odd number methyl ketones with chain length from $C_3$ to $C_{15}$ were quantified. In lipase C, $C_6$ methyl ketone was observed after 30 days at 40°F (Table 3). 2-heptanone and 2-nonanone were major methyl ketones for all the samples over ripening (Table 3). The pasteurized milk control contained no $C_{15}$. In lipase C (cheese) the typical pattern of individual methyl ketones from $C_3$ to $C_{15}$ carbon atom with odd numbers and $C_6$ over the ripening are shown in Table 4. The concentration of 2-heptanone was 76.06 $\mu$ moles per 10 gms and 2-nonanone with 32.45 $\mu$ moles of the dry cheese at 75th day of ripening.

TABLE NO. 2

Maximum Concentration of Carbonyls in Blue Cheese

| Sample | Days at 40°F | Total Carbonyls | Mono Carbonyls | Methyl Ketones |
|---|---|---|---|---|
| | | $\mu$Moles/10 g dry cheese DNPH derivatives | | |
| Control-Past. Milk | 0 | 3.78 | 3.60 | t |
| Control-Past. Milk | 90 | 165.72 | 95.25 | 47.63 |
| Cream & Skim-milk Control | 90 | 200.07 | 102.57 | 58.62 |
| Lipase A | 90 | 200.13 | 120.90 | 72.96 |
| Lipase B | 75 | 241.14 | 181.37 | 115.23 |
| Lipase C | 75 | 313.41 | 250.72 | 150.43 | t = trace

TABLE NO. 3

Concentration of Individual Methyl Ketones After 75th Day at 40°F.
$\mu$Moles per 10 g Dry Cheese DNPH derivatives

| Sample | $C_3$ | $C_5$ | $C_7$ | $C_9$ | $C_{11}$ | $C_{13}$ | $C_{15}$ |
|---|---|---|---|---|---|---|---|
| Control Past. Milk | .90 | 6.07 | 18.22 | 17.32 | 3.06 | 1.44 | — |
| Cream & Skim-milk Control | 3.66 | 4.26 | 18.35 | 16.25 | 9.61 | 4.35 | 1.65 |
| Lipase A | 4.28 | 9.10 | 26.32 | 17.85 | 5.83 | 3.64 | 0.73 |
| Lipase B | 2.17 | 10.51 | 39.86 | 34.79 | 12.68 | 11.23 | 3.99 |
| Lipase C | 1.35 | 4.39 | 76.06 | 32.45 | 16.90 | 10.14 | 4.73 |

TABLE NO. 4

Concentration of Individual Methyl Ketones for Microbial lipase C at Progressive Stages of Ripening

| Methyl ketones chain length | 30 | 45 | 60 | 75 | 90 |
|---|---|---|---|---|---|
| | $\mu$moles/10 g dry cheese DNPH derivatives | | | | |
| $C_3$ | 2.71 | 3.34 | 1.09 | 1.35 | 1.36 |
| $C_5$ | 11.47 | 11.52 | 3.80 | 4.39 | 4.58 |
| $C_6$ | 8.26 | t | t | t | t |
| $C_7$ | 32.75 | 43.64 | 62.96 | 76.06 | 74.52 |
| $C_9$ | 22.93 | 24.44 | 24.96 | 32.45 | 29.89 |
| $C_{11}$ | 3.95 | 6.11 | 13.24 | 16.90 | 15.39 |
| $C_{15}$ | t | t | 4.89 | 4.73 | 2.05 | t = trace

FLAVOR SCORE

Blue cheese made containing lipase C scored 40 (excellent) at 45 days at 40°F. The flavor score (Table No. 5) increased for most of the samples during ripening. However, the flavor score was 38.5, 39.0, 38.5, 39.5 and 40.0 for control pasteurized milk, pasteurized skim milk and raw homogenized cream, lipase A, lipase B and lipase C cheeses, respectively, after 75 days at 40°F.

TABLE NO. 5

Flavor of Blue Cheese at Progressive Stages of Ripening

| Days of Ripening 40°F. | Control Past. Milk | Raw Cream & Past. Skimmilk | Lipase A | Lipase B | Lipase C |
|---|---|---|---|---|---|
| | | Flavor Score | | | |
| 15 | 38.0 | 38.0 | 38.5 | 38.5 | 39.5 |
| 30 | 38.5 | 37.0 | 38.5 | 39.0 | 39.5 |
| 45 | 38.0 | 39.0 | 39.0 | 39.5 | 40.0 |
| 60 | 38.0 | 38.5 | 38.5 | 39.0 | 40.0 |
| 75 | 38.5 | 39.0 | 38.5 | 39.5 | 40.0 |

The laboratory testing procedures discussed above have led to several commercial procedures for producing blue cheese products.

EXAMPLE NO. 1

1. Setting the Milk

Pasteurized or heat-treated whole milk is made ready for setting by raising the temperature to about 88°F. and pumping the milk into a cheese vat. Then 0.5% active lactic starter is added to the recombined milk and the milk allowed to acid-ripen at the setting temperature for 1 hour. No annatto color is added, but if chemical bleaching is not practiced, a dye, such as chlorophyll in alkaline solution, is added in quantities sufficient to neutralize the oily yellowish cast of the curd (usually between 1 to 2-oz. dye per 1,000 lb. milk).

After the acid ripening period, single-strength rennet extract, 2 ½-Oz. (72 ml.) per 1,000 lb. whole milk is added. The rennet extract 1:40 is diluted with tap water. The milk is mixed well for 3 min., the vat covered, and it is left quiescent. A satisfactory curd usually forms in 30 minutes.

2. Cutting the Curd

When the curd is firm, it is cut into cubes with 5/8 inch standard wire knives.

3. Cooking the Curds

The cut cubes are permitted to remain undisturbed in the cheese vat for 5 minutes, then agitated gently, once every 5 minutes, until the titratable acidity of the whey rises about 0.03% (i.e., from 0.11 to 0.14% of whey). The acid rise occurs in about 1 hour, and during this time the temperature remains at 88°F. Just before drainage, the temperature is raised to 92°F. and held for 2 minutes.

4. Draining Whey

A vertical metal strainer is inserted in the exit gate and the curds in the whey are pushed to the back of the vat with a rake. After all the whey is drained, the curds are trenched gently.

5. Introducing Spores and Lipase

To 100 kilogram curds are added:
a. 5–30 grams food grade microbial lipase 4000 (Aspergillus ssp.) Wallerstein Company, Morton Grove, Illinois;
b. 60–70 gram *Penicillium roqueforti* spores, Midwest Blue Mold Company, Stillwater, Minnesota; and
c. about 2 kilograms sodium chloride.

The additives are stirred uniformly into the curds for 5 minutes.

6. Dipping the Curd

Partly salted, mold-inoculated curds are scooped into perforated, circular, stainless steel Blue Cheese molds.

7. Pressing or Molding Curd

The hoops are turned completely over every 15 minutes for the first 2 hours and left on drainage mats overnight at room temperature without any follower or surface weight, but covered with protective clean cheesecloth. The room temperature is kept at about 72°F. by proper controls.

8. Salting

The approximately 5-lb. wheel of curd is removed from the mold by encircling it with a spatula. After tapping the metal mold on the table, the cheese will drop out. Then the individual wheels of cheese are placed in a pail or box of plain coarse salt and all the surfaces are liberally covered with the salt. Any salt which remains loose can be brushed off; then the individual wheels are gently layed on their curved sides in a wooden cradle, in a 60°F - 95% humidity room. The cradle prevents the sides of the wheel from splitting. The heavy salting in this manner is repeated for 5 days (4 more times). At the end of this period, the cheese surface is very hard. Alternatively the wheels of cheese may be brined.

9. Needling Air Holes

After 5 days of salting, about 50 air holes are pierced on each of the cheese's flat sides with a long, ice pick, ⅛ in. in diameter, or with the mechanical head of a needling machine which produces 50 holes per single application. The air holes should penetrate through to the other side.

10. Mold Growth Period

The perforated cheese wheels are placed on their curved sides, 1 in. apart, in wooden cradle racks at 50°–60°F, and 95% relative humidity and are turned a quarter turn and wiped with a clean cloth every 4 days. Mold appears internally by about the 10th day. Turning and cleaning are continued for 20 more days.

11. Curing and Storing

After 1 month, all cheese surfaces are scraped and cleaned by hand or are buffed with a rotating burlap bag wheel. Temporarily the cheese is wrapped in foil and removed to a cold room, about 40°F. The cheese is held at this cold temperature for one to three months for full flavor and body development. Then the temporary foil is removed and the surfaces cleaned. It is then wrapped in a clean foil and distributed or stored cold.

The cheese held at 35°–40°F with proper spacing can remain in good condition for several more months.

EXAMPLE NO. 2

The first steps of Example No. 1 are performed, whereupon the loose curd product is incubated at 50°–60°F. for about 5 to 30 days, thereby to produce a loose cheese product which has utility in flavoring other products or which may be processed into a processed cheese type product.

EXAMPLE NO. 3

Same as Examples Nos. 1 or 2, but substitute animal lipase KL (Dairyland Food Laboratories, Waukeshaw, Wisconsin) for the microbial lipase 4000.

EXAMPLE NO. 4

Same as Examples Nos. 1 or 2, but substitute microbial lipase 250 (Miles Laboratories, Chicago, Illinois) for the microbial lipase 4000.

EXAMPLE NO. 5

Same as Examples Nos. 1 or 2, but substitute animal lipase or microbial lipase.

What is claimed is:

1. The method for producing blue cheese from pasteurized or heat-treated milk, which comprises in the recited sequence the steps of
   a. preparing loose cheese curds from said milk;
   b. introducing into the loose curds a mixture, by weight of curd, of:
      1. a food grade lipase selected from the group consisting of food grade microbial lipase and animal lipase, and
      2. Penicillium species mold spores, the amounts of lipase and Penicillium mold spores being sufficient to substantially reduce the time required for curing of the cheese while obtaining optimum cheese flavor characteristics to the resultant product; and
   c. incubating the resultant product from step (b) at high relative humidity to permit the outgrowth of mold spores and activity of the added lipase, whereby a highly flavored blue cheese product is obtained.

2. The method recited in claim 1, wherein the Penicillium mold spores are selected from the group consisting of *Penicillium roqueforti* and *Penicillium glaucum*.

3. The method for producing blue cheese from pasteurized or heat-treated milk, which comprises in the recited sequence the steps of
   a. preparing loose cheese curds from said milk;
   b. introducing into the loose curds a mixture, by weight of curd, of:
      1. a food grade lipase selected from the group consisting of food grade microbial lipase and animal lipase, 5–30 g/100 kg curd, and
      2. mold spores selected from the group consisting of Penicillium roqueforti, Penicillium glaucum, or related species, 60–70 g/100 kg curd; and
      3. sodium chloride, about 2 kg/100 kg curd, to obtain a salted cheese product; and
   c. incubating the resultant salted cheese product from step (b) at 50°–60°F at high relative humidity to permit the outgrowth of mold spores and activity of the added lipase, whereby a highly flavored blue cheese product is obtained.

4. The method as recited in claim 3, wherein the microbial lipase is obtained from a mold selected from the group consisting of Aspergillus ssp., Penicillium ssp. and Rhizopus ssp. and food grade animal lipase obtained from goat and calf sources.

5. The method as recited in claim 4, wherein the microbial lipase comprises lipase 4000 (Wallerstein Company, Morton Grove, Illinois).

6. The method as defined in claim 3, wherein the resultant salted cheese product is in loose form and is incubated for about five to thirty days, thereby to produce a highly flavored blue cheese product.

7. The method as defined in claim 3, and including the further steps, after the lipase, salt and mold spore mixture has been added to the curds, of
   e. molding the resultant product to a desired form;
   f. supplementing the salt level of the molded product;
   g. puncturing the molded product to define air passages to support growth of the mold spores, the resultant salted molded product being incubated for about one month; and
   h. ripening the resultant product at about 40°F for about 1 to 3 months to produce a high quality blue cheese flavor.

* * * * *